(12) United States Patent
Sato et al.

(10) Patent No.: US 8,295,584 B2
(45) Date of Patent: Oct. 23, 2012

(54) PATTERN MEASUREMENT METHODS AND PATTERN MEASUREMENT EQUIPMENT (75) Inventors: Hidetoshi Sato, Hitachinaka (JP); Ryoichi Matsuoka, Yotsukaido (JP)

(73) Assignee: Hitachi High-Technologies Corporation, Tokyo (JP)

( * ) Notice: Subject to any disclaimer, the term of this patent is extended or adjusted under 35 U.S.C. 154(b) by 803 days.

(21) Appl. No.: 12/389,885

(22) Filed: Feb. 20, 2009

(65) Prior Publication Data

US 2009/0238443 A1 Sep. 24, 2009

(30) Foreign Application Priority Data

Mar. 18, 2008 (JP) .................................. 2008-068656

(51) Int. Cl.
*G06K 9/00* (2006.01)
(52) U.S. Cl. ...................................................... 382/145
(58) Field of Classification Search .................. None
See application file for complete search history.

(56) References Cited

U.S. PATENT DOCUMENTS

| 6,868,175 | B1 | 3/2005 | Yamamoto et al. |
| 7,026,615 | B2 | 4/2006 | Takane et al. |
| 2002/0015518 | A1 | 2/2002 | Matsuoka |
| 2004/0019870 | A1* | 1/2004 | Ohmori ............................ 716/19 |
| 2006/0193508 | A1 | 8/2006 | Sutani et al. |
| 2006/0291714 | A1* | 12/2006 | Wu et al. ......................... 382/149 |
| 2007/0092129 | A1* | 4/2007 | Sugiyama et al. ............ 382/145 |

FOREIGN PATENT DOCUMENTS

| JP | 2001-338304 | 12/2001 |
| JP | 2002-031525 | 1/2002 |
| JP | 2002-328015 | 11/2002 |
| JP | 2006-234588 | 9/2006 |
| JP | 2007-079982 | 3/2007 |

* cited by examiner

*Primary Examiner* — Jingge Wu
*Assistant Examiner* — Nirav G Patel
(74) *Attorney, Agent, or Firm* — McDermott Will & Emery LLP (57) ABSTRACT An object of the present invention is to provide methods and equipment capable of providing highly accurate matching using a template including multiple patterns even when the shapes of some patterns of the template are different from corresponding ones of a SEM image, and when the template and the SEM image have a magnification error. Proposed, as a technique for achieving the object, is a method for performing matching by selectively using some of multiple patterns provided in a predetermined region of design data, and equipment for implementing the method. Moreover, proposed, as another technique for achieving the object, is a method for performing first matching by using multiple patterns provided in a predetermined region of design data and thereafter performing second matching by using some of the multiple patterns provided in the predetermined region, and equipment for implementing the method.

2 Claims, 9 Drawing Sheets

PATTERN MEASUREMENT METHODS AND PATTERN MEASUREMENT EQUIPMENT

BACKGROUND OF THE INVENTION

1. Field of the Invention

The present invention relates to pattern measurement methods and pattern measurement equipment and, in particular, to methods and equipment for measuring patterns in an image produced by a charged particle beam apparatus.

2. Description of the Related Art

A general manufacturing process of a semiconductor integrated circuit employs pattern measurement using a charged particle beam apparatus such as a scanning electron microscope. Recently, the use of design data (also referred to as computer aided design (CAD) data for convenience, below) of patterns has become common in such measurement.

Japanese Patent Application Publication No. 2002-328015 (corresponding to U.S. Pat. No. 7,026,615) discloses a technique for creating a template for pattern matching on the basis of CAD data, and thereby performing a matching process on the template based on the CAD data and a scanning electron microscope (SEM) image. Japanese Patent Application Publication No. 2007-079982 (corresponding to US 2007/0092129) discloses a pattern matching technique using a contour line segment group extracted from CAD data.

Japanese Patent Application Publication Nos. 2001-338304 (corresponding to U.S. Pat. No. 6,868,175), 2002-031525 (corresponding to US 2002/0015518) and 2006-234588 (corresponding to US 2006/0193508) disclose techniques for detecting and comparing edges of an inspected pattern and a datum pattern, and thereby detecting a shift amount of the inspected pattern with respect to its design data.

SUMMARY OF THE INVENTION

Although, the above-cited patent documents disclose techniques for matching between CAD data and a SEM image, the techniques are not intended to correct a matching error occurring due to difference in shape between some of multiple patterns included in a matching template and corresponding ones of a SEM image. In addition, in some cases, a template based on CAD data and a SEM image have a magnification error caused by various factors. However, the techniques disclosed in the above-cited patent documents are not intended to correct a matching error resulting from a magnification error occurring when a template includes multiple patterns.

In the following, methods and equipment capable of providing highly accurate matching using a template including multiple patterns will be described. According to the methods and equipment, highly accurate matching can be provided even when the shapes of some patterns of the template are different from corresponding ones of a SEM image and when the template and the SEM image have a magnification error will be described.

The present invention proposes, as a technique for solving the above-described problems, a method for performing matching by selectively using some of multiple patterns provided in a predetermined region of design data, and equipment for implementing the method. Moreover, the present invention proposes, as another technique for solving the above-described problems, a method for performing first matching by using multiple patterns provided in a predetermined region of design data and thereafter performing second matching by using some of the multiple patterns provided in the predetermined region, and equipment for implementing the method.

With these configurations, highly accurate pattern matching can be performed without any influence of differences in shape between corresponding patterns or a magnification error.

DESCRIPTION OF SYMBOLS

1 . . . electron source (electron gun), 2 . . . electron beam, 3 . . . electron lens, 4 . . . sample, 5 . . . secondary electron, 6 . . . secondary electron detective system, 7 . . . control system, 8 . . . X-Y-Z stage, 9 . . . image display, 10 . . . design data managing unit, 31 . . . move stage to measurement position, 32 . . . perform addressing operation, 33 . . . perform auto-focus operation, 34 . . . perform image matching, 35 . . . perform dimension comparison with CAD data, 41 . . . SEM image obtained by critical dimension SEM (CD-SEM), 42 . . . perform edge extraction, 43 . . . perform smoothing, 44 . . . perform matching process, 51 . . . SEM image obtained by CD-SEM, 52 . . . CD-SEM image of main pattern, 53 . . . CD-SEM image of assist pattern, 61 . . . displayed CAD data, 71 . . . main pattern in CAD data, 72 . . . assist pattern in CAD data, 81 . . . perform matching targeting entire image, 82 . . . perform matching targeting main pattern, 91 . . . SEM image obtained by CD-SEM, 92 . . . hole pattern, 101 . . . displayed CAD data, 121 . . . displayed CAD pattern data to be used for matching,

DETAILED DESCRIPTION OF THE PREFERRED EMBODIMENTS

Concrete configurations for solving the above-described problems will be described below. The following description is related to a measurement method based on comparison between CAD data and an image of actually manufactured patterns produced by a scanning electron microscope called a critical dimension SEM (CD-SEM), or a location identification method using pattern matching. Such methods are high in profile in pattern dimension measurement in fabrication process of semiconductor integrated circuit and photomasks. Although a CD-SEM is used as an example in the following description, a charged particle beam apparatus to be used is not limited to a CD-SEM, and can be any such as a focused ion beam (FIB) apparatus.

Especially in comparison with CAD data, a dimensional difference is often determined as follows. The CAD data is overlaid with the image produced by the CD-SEM. Then, the signal strengths at pattern edges of the image data are quantified, and a representative point of the edges is determined by using a predetermined threshold. On the basis of a distance between the representative point and a corresponding portion of the CAD data, a dimensional difference is determined. Such a technique for measuring the distance between a segment of CAD data and a pattern edge is often called edge placement error (EPE) measurement. In EPE measurement, a measurement result varies depending on which portions of CAD data and a CD-SEM image are compared. For this reason, it is essential to define a method to be a standard, and to determine portions to be evaluated, which requires identification of the positional relationship between CAD data and an image of an actual photomask before dimension measurement. In conventional techniques, the positional relationship between a CD-SEM image and related CAD data is determined by performing matching between the CD-SEM image and the entire CAD data.

An example of such pattern matching is correlation operation for determining positions of a CD-SEM image indicating a secondary electron intensity distribution and a CAD data pattern called a template or a pattern image taken before measurement and having the same form as the CAD data pattern. Specifically, through an evaluation based on correlation operation for determining positions of the template and the CD-SEM image in two-dimensional directions, an X-Y position in which the template image and the CD-SEM image have the highest correlation are determined, and the template image is overlaid with the CD-SEM image at the position.

Recent photomask patterns are often subjected to an optical proximity correction (OPC) process, and consequently formed to be stepwise patterns or to have projections and depressions at corner portions thereof, due to their positional relationships with neighboring patterns, in many cases.

Moreover, assist patterns called sub resolution assist feature (SRAF) patterns are also used in some cases. A SRAF pattern is a microscopic pattern that is not resolved in projection lithography in photolithography for printing patterns on a silicon wafer by using a photomask. SRAF patterns are used when needed, for example: 1) in projection lithography for printing wafer patterns due to the intensity distribution; 2) to reduce micro-loading effect in etching; and 3) to eliminate difference in level in chemical mechanical polishing (CMP).

The dimensions of such a part of a pattern subjected to the OPC process and an assist pattern, for example, a SRAF pattern, are smaller than those of a main pattern. For this reason, accuracy in pattern dimensions is not required of those patterns in many cases. In addition, since those patterns have finer shapes than that of the main pattern, they have lower pattern fidelities with respect to design data than the main pattern. This is because such a fine pattern cannot be reproduced as close to the design data as the main pattern can be by electron beam exposure, a resist process or an etching process, due to the limits of such a photomask process.

In the above description, assist patterns and their low pattern fidelity in the case of using a photomask have been described. This low pattern fidelity of assist patterns also leads to a problem that, when assist patterns are included, a definition of a positional relationship between the entire CD-SEM image and the CAD data based on matching cannot be optimal in some cases. In other words, with variations in positions of the assist patterns and their pattern fidelities, a matching error attributable to the assist patterns occurs, consequently affecting the main pattern, in some cases.

In many cases, since difference measurement with a CAD data pattern is often performed on the main pattern, it is obvious that the matching error attributable to the assist patterns affects the measurement result based on the main pattern.

Matching between the entire CD-SEM image and the CAD data has another problem that the entire CD-SEM image and the CAD data have a magnification error. In the CAD data, since pattern positions are determined on a grid, the position of a pattern can be determined accurately in minimum grid unit. By contrast, in the CD-SEM image of a photomask pattern, a magnification error occurring in the region in the image at the time of lithography appears, while, in the CD-SEM image of a wafer pattern, a magnification error occurring at the time of projection lithography appears.

Assume that matching is performed for the entire image while such a magnification error is occurring. In such a case, it is obvious that the dimensional difference between the CD-SEM image and the CAD data is small in a central portion of the CD-SEM image while being large at an edge portion of the image. This trend is especially prominent in evaluating a dimensional difference by decreasing the magnification, for example, in evaluating differences between the dimensions of multiple patterns on a single screen.

The following techniques are examples of a concrete technique for solving the above-described problems.

The first example is a technique for performing pattern matching on part of a CD-SEM pattern image and a corresponding part of a CAD pattern to evaluate a dimensional difference between the image and the CAD data.

An example of a concrete evaluation method is as follows. In this method, correlation operation is employed in a matching process for a CD-SEM image having a secondary electron intensity distribution and a CAD data pattern. Here, each measurement pixel of the CD-SEM image data is converted into a number (referred to as an intensity value) based on secondary electron intensity distribution, and the intensity value of each pixel is stored as two-dimensional allay information, in a memory of a control computer.

Since the CAD data consists of straight lines forming the peripheries of patterns, a portion surrounded by the sides of a pattern to be compared, that is, a portion surrounded by straight lines, in the CAD data is divided so as to have the same pitch as the pixels. Then, positive numeric value of the pixel corresponding to each straight line is set to be CAD data pixel information while setting CAD data pixel information of each pixel corresponding to no straight line at 0, and the CAD data pixel information is stored as two-dimensional allay information in the memory.

Correlation operation is performed by using the two kinds of information stored in the memory, and the position resulting in the maximum value is determined as a matching position according to the matching result. In this correlation operation, the comparison target portion of the CAD data is smaller than that of the CD-SEM image. Accordingly, the CAD data is moved on a pixel-by-pixel basis in the X and Y directions, to obtain the product of the intensity value of the CD-SEM image and the CAD data pixel information value for each pixel, and then set the sum of the products to be an evaluation value of the correlation operation. The X-Y position resulting in the maximum evaluation value of the correlation operation is the position at which the CAD data and the CD-SEM image has the least difference, in other words, the matching position.

By means of the above-described method, matching on a part of the CAD data and a part of the CD-SEM image can be established, which enables comparisons for dimension measurement evaluation and other measurement evaluations to be performed in an optimal overlaid-state.

Next, the second example will be described. This method is the same as the first example in that pattern matching is performed on a part of a CD-SEM pattern image and a part of a CAD pattern, but is different in that matching is performed twice.

In this method, first matching is performed on the entire CD-SEM image and the CAD data of the entire corresponding portion. On the basis of the result, the positions of the CAD data patterns with respect to image patterns are determined.

In second matching, pattern matching is performed only on a dimension evaluation target portion. In this matching, since matching has already been established between the CD-SEM image and the CAD data with an error within approximately 10 nm in the first matching, the range for which correlation operation is to be performed, that is, the X-Y range in which the CAD data is to be moved, can be small.

The reason for performing matching twice is to prevent a matching error attributable to assist patterns as described in "SUMMARY OF THE INVENTION." In the following description, an example in which matching is performed twice will be described. However, the number of times of matching is not limited to two, but may be three or more as appropriate. Moreover, in the second pattern matching and thereafter, compared to the first matching, the search range can be set smaller and the number of patterns presented as a template (the number of patterns included in the template) can be set smaller. Thereby, a highly accurate and highly efficient matching process can be performed. Especially for the second matching and thereafter, it is desirable to select patterns having uniform shapes and not those having ununiform shapes such as some of OPC patterns and SRAF patterns.

The description has been given of the technique for optimizing matching at dimension evaluation positions by performing matching on the CD-SEM image and corresponding patterns of the CAD data. In such a technique for performing matching targeting some patterns, discrimination or classification needs to be made in association with the target patterns of the matching in the CAD data to be used in the matching.

This pattern classification is used only in relation to the CD-SEM image. Hence, it is necessary to provide information on patterns or sides for pattern matching in CAD data in advance by a different process from a conventional one. However, such information corresponds to the targets of dimension and other evaluations, and the evaluation targets always exist as measurement information. For this reason, in some cases, no special process needs to be performed although a matching process is to be performed only on some patterns.

Even when the dimension evaluation target portions and the matching evaluation target portions are not the same, it is only necessary to define information on the matching portions in the CAD data. A method for such definition can easily be implemented by layering the CAD data or assigning flags to target data pieces.

An example for performing proper matching when the CD-SEM image and the CAD data have a magnification error will be described. A typical example of this case is when patterns repeated in a small region, such as memory cell patterns, are used. Assume that a single image including multiple memory cell patterns is captured to perform dimension evaluation for each memory cell, and that the image and the CAD data have a magnification error. In such a case, when matching is performed on the entire image, an error occurring in a central portion of the image is smaller than that occurring in a peripheral portion of the image. Consequently, a matching error occurs in the peripheral portion.

To solve the problem of a matching error attributable to a magnification error, the above-described two levels of matching are performed for each memory cell or each evaluation target pattern in each memory cell. By performing matching for each evaluation target portion again before dimension evaluation, errors in association with positions of the memory cells in the image can be eliminated, so that dimension comparison with respect to the CAD data can be performed on all the memory cells.

With this configuration, matching can be performed between the evaluation target portions of the CD-SEM image data and the corresponding portions of the CAD data. Accordingly, dimension evaluation and other evaluations can be stably performed without any influence of the qualities of the assist patterns.

Moreover, even when cyclic patterns such as multiple memory cells are to be measured in a single image having a magnification error, matching performed for each memory cell or each evaluation target portion in each memory cell enables a fair dimension comparison with the CAD data for each memory cell.

First Embodiment

A more concrete embodiment will be described below with reference to the accompanying drawings. The scanning electron microscope described below as an example has a length measuring function for measuring shapes and dimensions of patterns formed on a wafer or a photomask to be used in the fabrication of semiconductor integrated circuits, and will also be referred to as a "CD-SEM," below. In the following, schematic description will be given of the scanning electron microscope.

An electron optical system of the SEM shown in FIG. 1 as an example performs scanning as follows. An electron beam 2 is emitted by an electron source (electron gun) 1 that emits electrons, and is then converged on a sample 4 such as a wafer or a photomask through an electron lens 3, to scan the sample 4 in a certain order. Emission of the electron beam generates a secondary electron 5 on a surface of the sample 4. The secondary electron 5 thus generated is detected by a secondary electron detective system 6, and is then inputted, as image data, to a control system (control processor) 7 having an image calculation control function. Here, the sample 4 can move in the three-dimensional directions or the two-dimensional directions, i.e., X and Y directions, by using an X-Y-Z stage 8. The control system 7 also controls the electron source 1, the electron lens 3, the secondary electron detective system 6, the X-Y-Z stage 8 and an image display 9.

In this embodiment, the sample 4 is scanned two-dimensionally (in the X and Y directions) with the electron beam 2 by using unillustrated scanning coils. Signals detected by a secondary electron detector of the secondary electron detective system 6 are amplified by a signal amplifier of the control system 7. Thereafter, the amplified signals are transferred to an image memory, and are then displayed as a sample image by the image display 9. The secondary electron detector may be a type detecting secondary electrons or reflected electrons, or a type detecting lights or X-rays.

Address signals corresponding to the memory positions of the image memory are generated in the control system 7 or an externally-provided computer. The generated address signals are converted into analog signals, and are then supplied to the scanning coils. In the case where the image memory consists of 512×512 pixels, for example, X-direction address signals are digital signals respectively indicating 0 to 512 repeatedly while Y-direction address signals are digital signals respectively indicating 0 to 512 repeatedly by being incremented by 1 each time X-direction address signals reached 512 from 0. Such digital signals are converted into analog signals before being supplied to the scanning coils.

Since the addresses of the image memory and the addresses indicated by deflection signals for scanning with an electron beam correspond to each other, the image memory stores a two-dimensional image of a deflection region of the electron beam by the scanning coils. The signals in the image memory can be sequentially read out in the time series by a read address generation circuit synchronized by a read clock. The signals corresponding to the addresses thus read out are converted into analog signals to function as luminance modulation signals in the image display 9.

The control system 7 includes an unillustrated input unit which is capable of specifying image capture conditions (such as scanning speed and the total number of images) and a field-of-view correction method as well as instructing the outputting, storing and the like of images.

The equipment described in this embodiment has a function of creating a line profile on the basis of the detected secondary electrons, reflected electrons or the like. The line profile is created on the basis of the amount of electrons detected in one-dimensional scanning or two-dimensional scanning with a primary electron beam, luminance information on the sample image, or the like, and is used for dimension measurement and the like of patterns formed on a semiconductor wafer or patterns formed on the photomask, for example.

Figure 1:
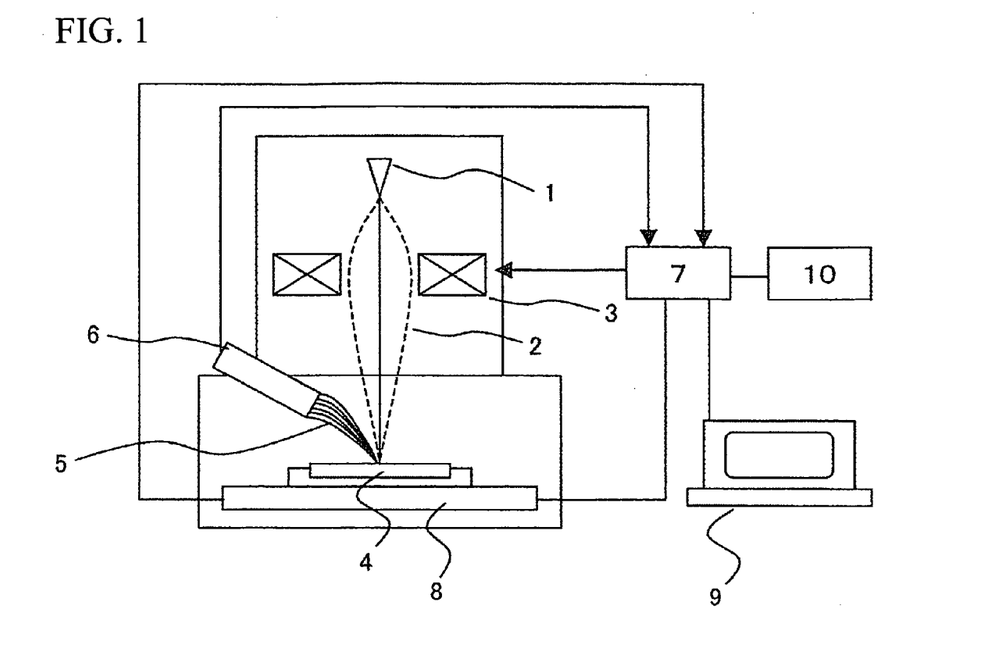
FIG. 1 is a diagram schematically showing a scanning electron microscope.

In the above description with reference to FIG. 1, the control system 7 is provided integrally with the scanning electron microscope or has a similar configuration. However, the control system 7 is, of course, not limited to such configurations, and may be a control processor provided separately from the scanning electron microscope and perform the following processing. In this case, also needed are: a transfer medium that transfers signals detected by the secondary signal detector, to the control processor and transfers signals from the control processor to the lens and the deflector of the scanning electron microscope; and input/output terminals for inputting and outputting signals transmitted through the transfer medium.

The equipment according to this embodiment also includes a function of: storing, in advance, conditions for observing multiple points, for example, on the semiconductor wafer or the photomask (such as measurement positions and optical conditions of the scanning electron microscope) as a recipe; and performing measurement and observation in accordance with the contents of the recipe.

Alternatively, a program for performing processing to be described below may be registered to a storage medium so that the control processor for supplying necessary signals to the scanning electron microscope would execute the program. In other words, the example to be described below can also be understood as a program or a program product which can be used in a charged particle beam apparatus such as a scanning electron microscope with an image processor.

The control system 7 also includes a design data managing unit 10 that stores design data of patterns on the semiconductor wafer (also referred to as CAD data), and converts the design data into data required for controlling the SEM. The design data managing unit 10 has a function of creating, on the basis of design data of semiconductor patterns inputted by an unillustrated input unit or the like, a recipe for controlling the SEM. The design data managing unit 10 also has a function of renewing the recipe on the basis of signals transferred from the control system 7. In this embodiment, the design data managing unit 10 is described as a unit separately provided from the control system 7, but is not limited to this configuration. Instead, the control system 7 may be integrally provided with the design data managing unit 10.

Figure 2:
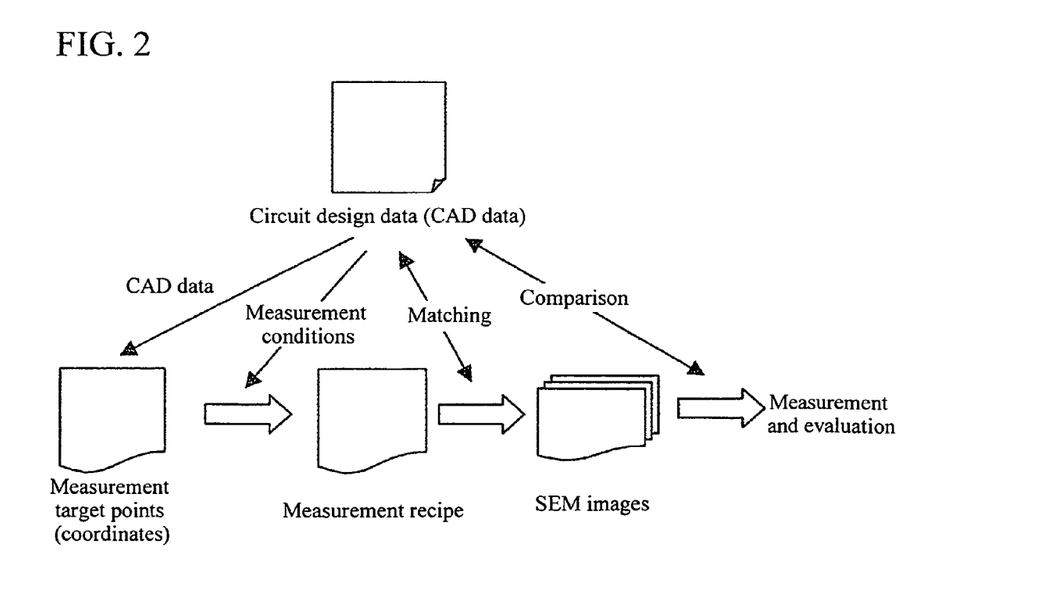
FIG. 2 is a diagram showing a flow of measurement processing using a recipe generated on the basis of design data.

FIG. 2 is a diagram showing an outline of a measurement method using a recipe created on the basis of CAD data. First, a recipe for performing measurement by using the CD-SEM is created for CAD data corresponding to a measurement target point and a corresponding evaluation point. In accordance with the created recipe, an image of the measurement position on the measurement target mask is produced by the CD-SEM. The produced image is compared with the CAD data, a measurement region is set in the image, and dimension measurement and evaluation of the region are performed. Since measurement position alignment is performed in the course of measurement in FIG. 2, operations, such as position alignment called addressing and focus for causing an electron beam to focus on the pattern, are required. For such operations, a method disclosed in Japanese Patent Application Publication No. 2006-234588 (corresponding to US 2006/019358) is employed.

Figure 3:
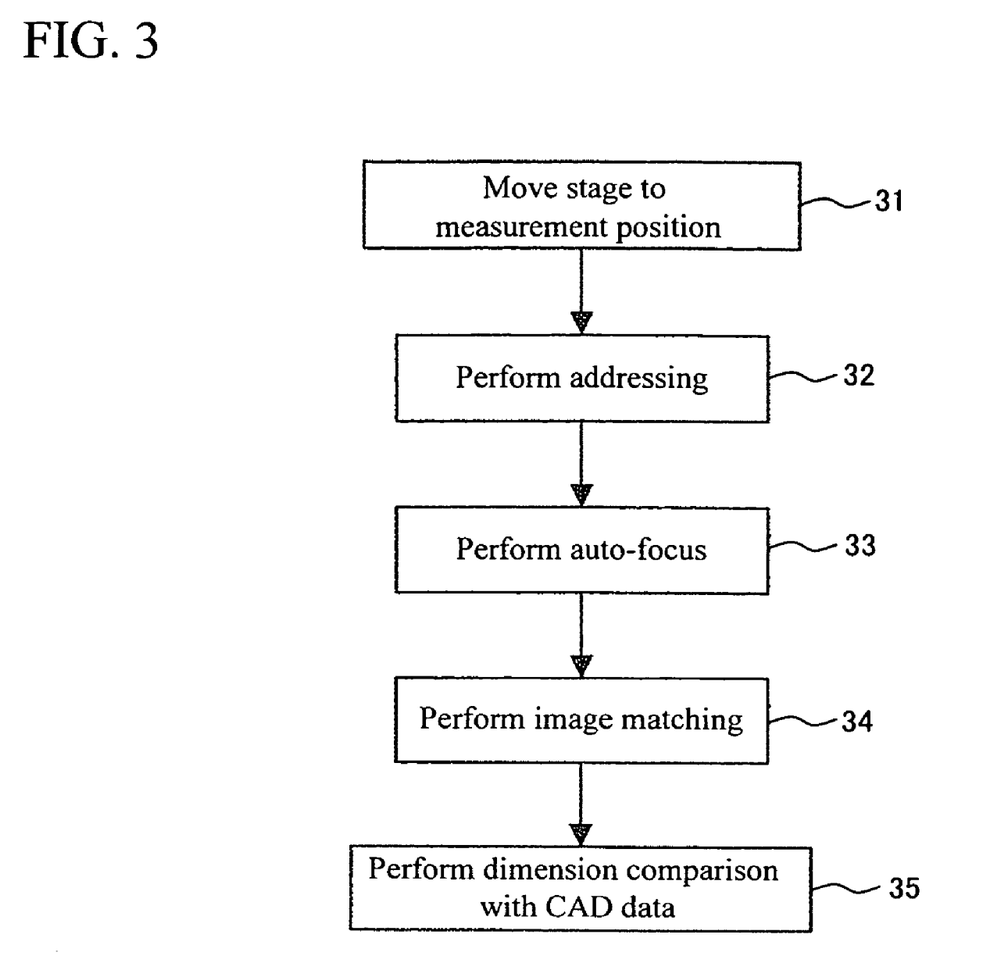
FIG. 3 is a flowchart showing a flow of dimension measurement processing based on a comparison between CAD data and a SEM image.

FIG. 3 shows a process of: obtaining an image of the measurement position on the measurement target mask in accordance with the recipe created in FIG. 2 by using the CD-SEM; comparing the obtained image with the CAD data; setting a measurement region; and then performing dimension measurement and evaluation of the region.

First, the stage moves to the measurement position on the basis of the coordinate data set in the recipe (31). Then, position alignment of the image data called addressing operation is performed (32). In the addressing operation, the CD-SEM image is obtained at a lower magnification than measurement magnification, and the CD-SEM image and CAD data corresponding to the portion in the CD-SEM image are compared. Through this operation, a position error between the CAD data and the image data is reduced to approximately 20 nm at maximum. Subsequently, the auto-focus operation is performed on the image at magnification close to the measurement magnification (33). Through this auto-focus operation, focus of the beam in obtaining a measurement target image is determined. Thereafter, an image of the measurement target position is obtained at the magnification specified in the recipe, by storing secondary electron signals in the image memory through deflection described on the basis of FIG. 1. Then, image matching between the obtained image and the CAD data is performed (34).

Figure 4:
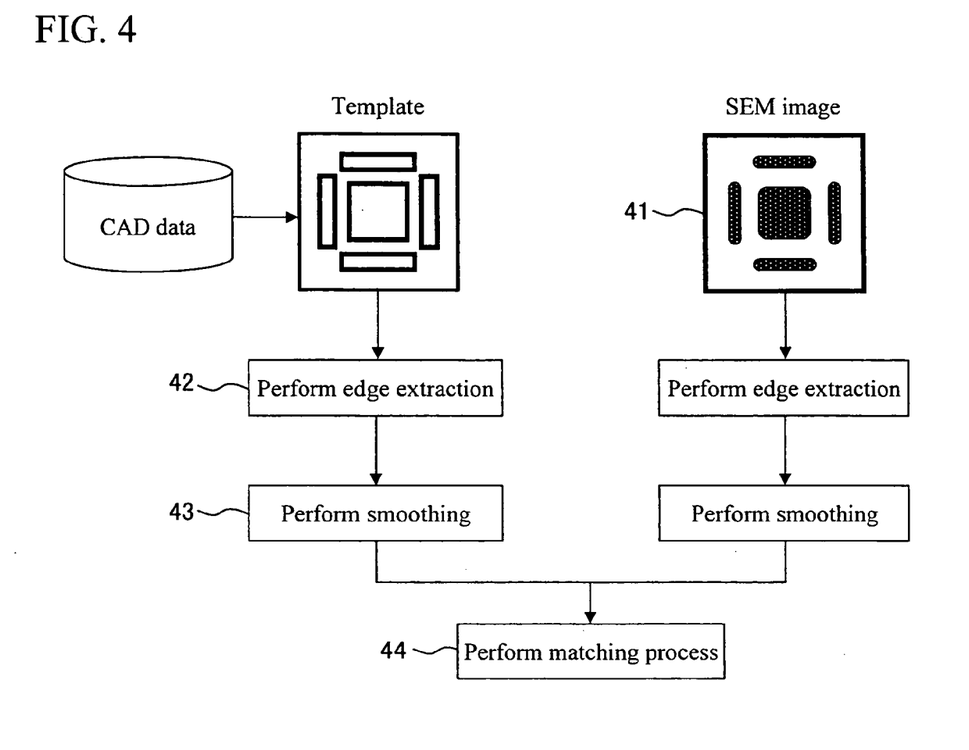
FIG. 4 is a flowchart showing a flow of matching process between the CAD data and the SEM image.

In an image matching method, as shown in FIG. 4, edge extraction is performed on a template created on the basis of the CAD data and the CD-SEM image data (41), and a smoothing arithmetic operation is performed on the edge data for the purpose of noise reduction. Thereafter, correlation arithmetic operation is performed for image matching, and the result is stored in the computer.

Since the positional relationship between the CAD data and the image data is established in this state, measurement of positional shift between the CAD data and the image data, called EPE measurement, is performed by the controller or the computer in accordance with the processing method described in the recipe, and the result is outputted to the display and is also stored (35).

As described above, in the template matching, a matching process is performed on each of the CD-SEM images and the template of the corresponding portion.

However, a CD-SEM image of a photomask to be used in the fabrication of semiconductor integrated circuits includes many OPC patterns and assist patterns called SRAF patterns. Moreover, evaluation of a main pattern is based on differences in dimensions and areas.

Figure 5:
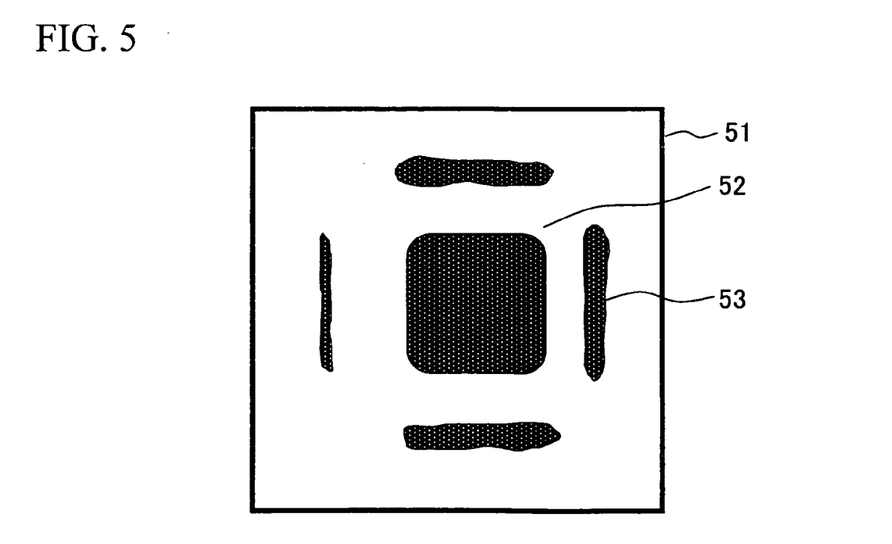
FIG. 5 is a view showing a SEM image of a compound pattern including a main pattern and assist patterns.
Figure 6:
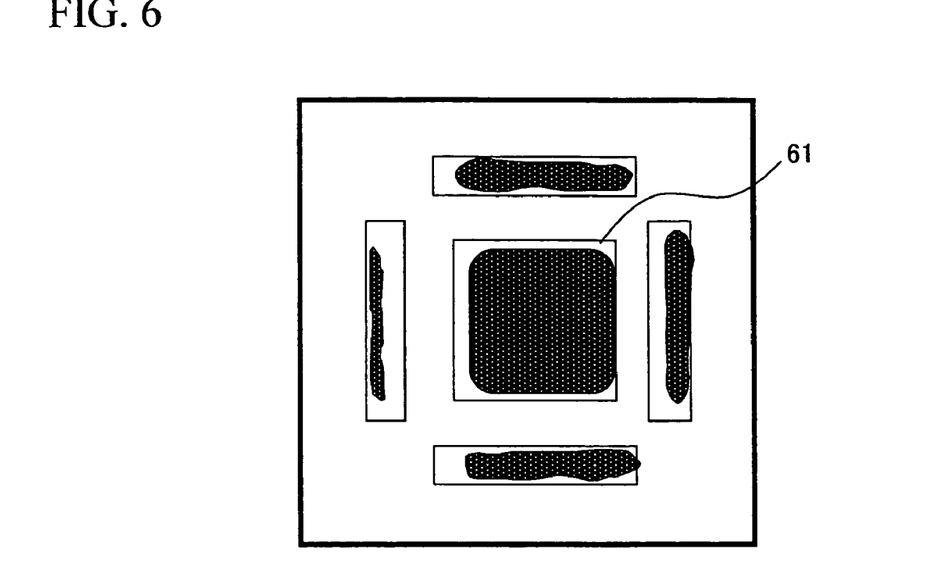
FIG. 6 is a view showing an example of matching using the compound pattern.

The example of a CD-SEM image 51 shown in FIG. 5 includes a square main pattern 52 and four rectangular assist patterns 53 arranged around the main pattern 52 in the vertical and horizontal directions. When matching is performed on the image 51 and CAD data 61 by means of the method shown in FIG. 3 and FIG. 4, the entire image is shifted due to failure of the assist pattern provided on the left side (FIG. 6). This shift of 10 nm is a problem in comparison between the CAD data and the actually created photomask patterns since the mask has dimension accuracy specification of ±2 nm.

Figure 7:
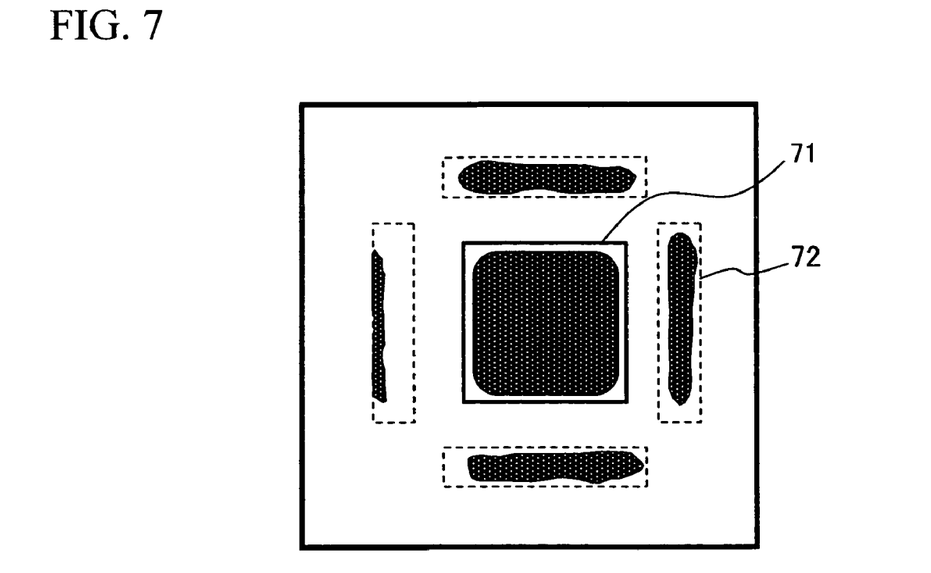
FIG. 7 is a view showing an example of matching selectively using the main pattern.

To address this problem, in this embodiment, matching is performed by targeting only the main pattern after the completion of the auto-focus operation (FIG. 7). Consequently, positional shift of the main pattern portion is corrected, so that difference measurement can be performed on the CD-SEM image and the CAD data.

Although the matching target region of the CAD data normally includes both the main pattern and the assist patterns, processing is performed by selectively using one of the two types or by excluding the other type from the target region, to register the main pattern as a template. In short, in this embodiment, the main pattern and the assist patterns are handled differently. To handle the two types of patterns differently, a symbol or a flag different from that assigned to the assist patterns can be assigned to the main pattern in the CAD data. It is possible to determine whether the matching is performed by targeting only the main pattern or targeting the entire image data, by selecting matching target patterns in creating the recipe.

The difference between the main pattern to be used for matching and the assist patterns can also be shown easily on the image display. Specifically, as shown in FIG. 7, CAD data 71 used for matching and surrounding the main pattern is indicated by a solid line, and CAD data 72 of each assist pattern not used for matching is indicated by a dotted line. With this differentiation, a user of the equipment can easily recognize the pattern used for matching on the screen. Here, a solid line and a dotted line are used for the differentiation of the pattern types. However, different colors can also be used for the differentiation, instead.

Figure 8:
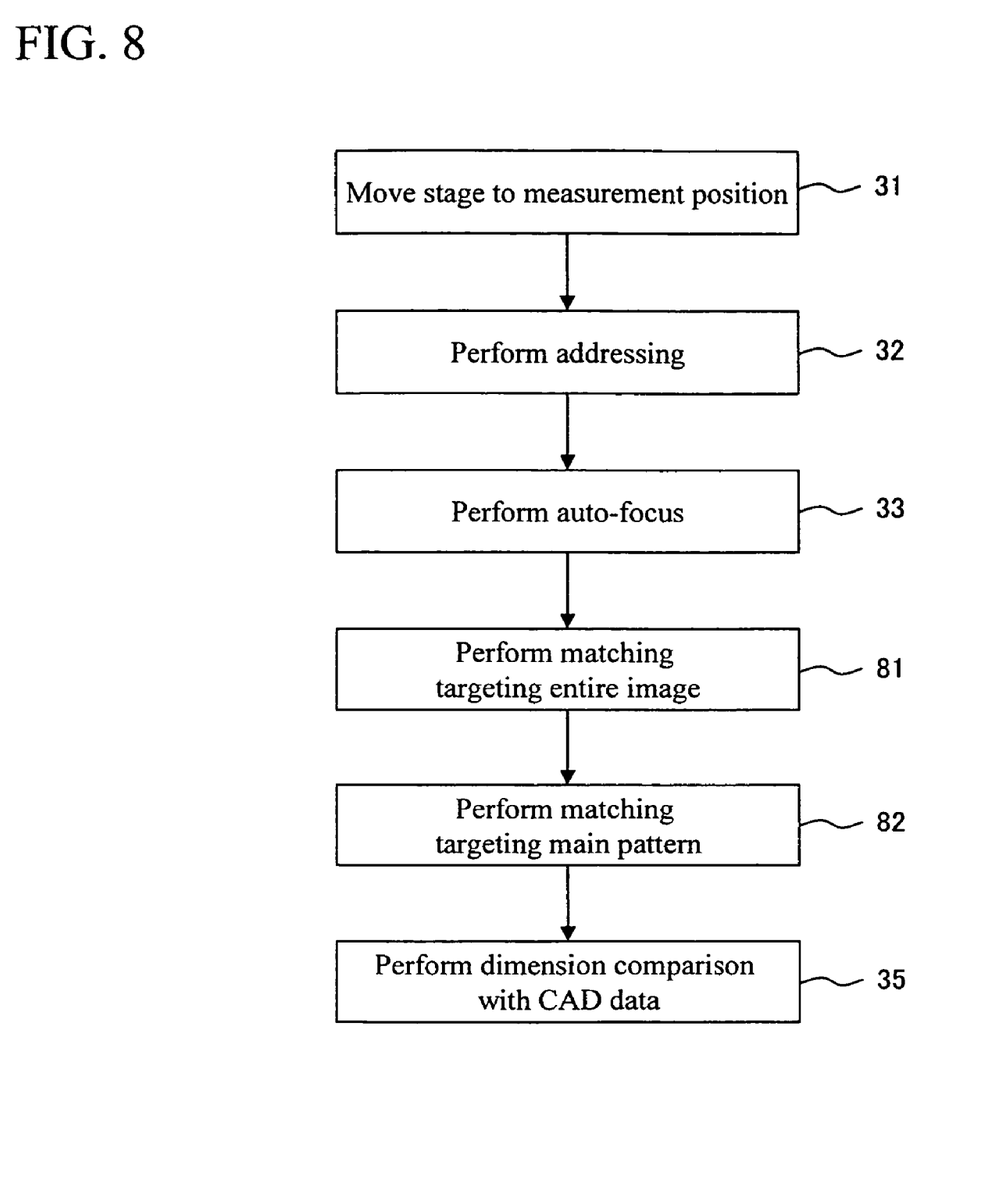
FIG. 8 is a flowchart showing a flow of matching process using the main pattern.

In the example shown in FIG. 6, matching targeting a part of CD-SEM image has been described. However, a method in which matching is performed in two levels is also possible. Specifically, as shown in the flowchart of FIG. 8, after matching targeting the CD-SEM image and the CAD data shown in FIG. 4, matching may be performed again by targeting only the main pattern.

By thus performing matching in two levels, it is possible to perform evaluations while gradually reducing positional errors as: positional error at the time of addressing <20 nm; positional error at the time of matching targeting the entire image in FIG. 4 <10 nm; and positional error at the time of matching targeting only the main pattern <2 nm. Thus, the region for which correlation operation is to be performed on the main pattern in the final evaluation can be defined. As a result, accuracy of correlation operation is increased, and reliability of the measurement result can also be increased.

In the case of performing matching in multiple levels as described above, it is desirable to select patterns having unique shapes in the matching in a relatively early level (the first level, for example) while selecting patterns having uniform shapes in the matching in a relatively late level (the second level, for example). In the template matching, the pattern included in the template needs to have a characteristic shape, because, if the pattern has a simple shape, it is difficult to distinguish the pattern from other patterns having similar shapes, leading to a matching failure. For example, the main pattern 52 shown in FIG. 4 has a simple square shape, and if a pattern having a similar shape is arranged near the main pattern 52, the neighboring pattern may be mistakenly recognized as a matching position. To avoid such a state, a complicated pattern including a main pattern and SRAF patterns are used in searching a large region, and, after search target region is defined, a main pattern having a uniform shape is used in matching requiring high accuracy, in this embodiment.

With this configuration, highly accurate matching resulting from matching based on unique pattern shapes and matching based on less-complex pattern shapes can be achieved.

In this embodiment, description has been given of a technique in which, after the first matching targeting a compound pattern including the main pattern (first pattern) and the SRAF patterns (second patterns), the second matching is performed by targeting the main pattern in the region specified by the first matching. However, the application of the technique is not limited to this case, but is also possible when patterns having unique shapes and patterns having uniform shapes are different, for example.

Second Embodiment

In the first embodiment, described have been the method of matching targeting some patterns in the matching process performed on a CD-SEM image and CAD data, and its effects. In the second embodiment, a matching method for the case in which CAD data and a CD-SEM image have a magnification error will be described.

In the CAD data, since pattern positions are determined on a grid, the position of a pattern can be determined accurately in minimum grid unit. By contrast, in the CD-SEM image of a photomask pattern, a magnification error occurring in the region in the image at the time of lithography appears, while, in the CD-SEM image of a wafer pattern, a magnification error occurring at the time of projection lithography appears.

Figure 9:
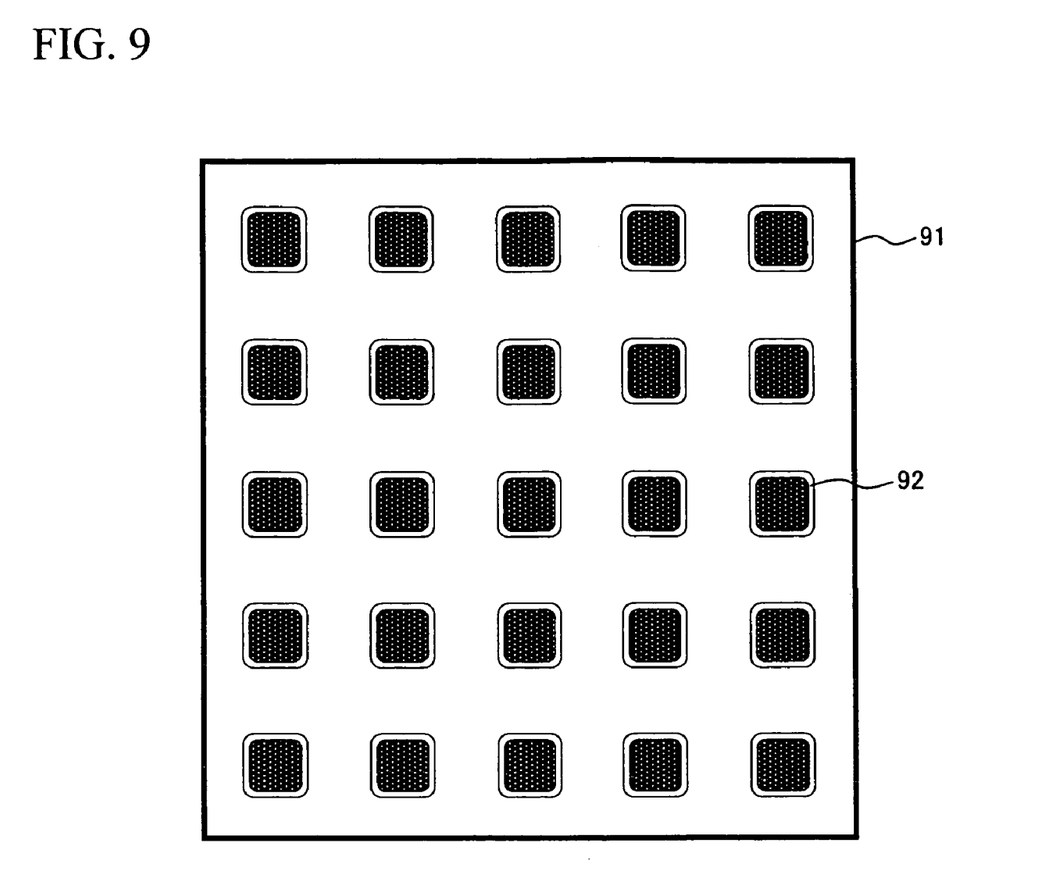
FIG. 9 is a view showing a SEM image of a part of a photomask including hole patterns.
Figure 10:
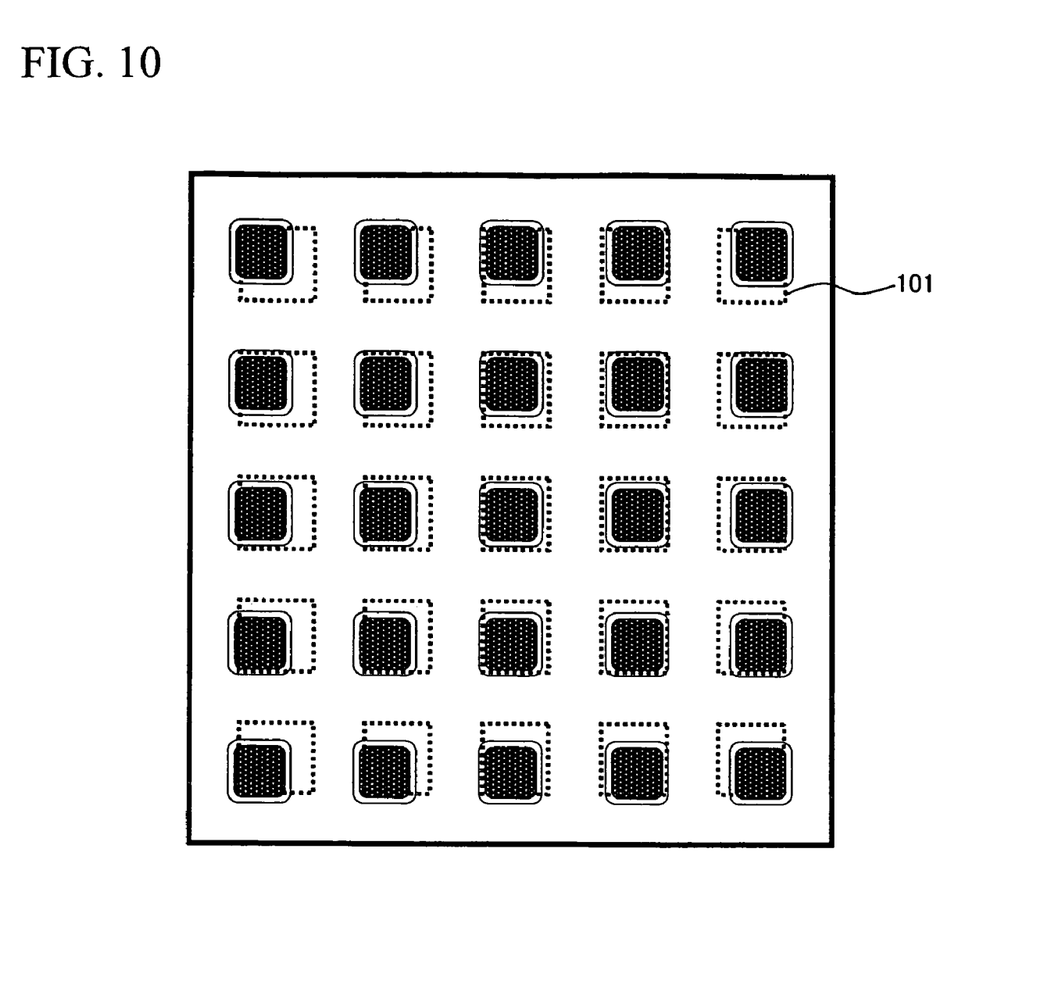
FIG. 10 is a view showing an example of matching performed on CAD data and the SEM image of the part of the photomask.

FIG. 9 shows a CD-SEM image of a part of a photomask including 5×5 memory hole patterns 92. This image has variation in magnification, and the image with CAD data overlaid thereon is shown in FIG. 10. Although the magnification error between the image and the CAD data is exaggerated in FIG. 10 for the sake of clarity, the nature is not distorted.

Assume that matching is performed by targeting the entire image of the example shown in FIG. 10. In such a case, it is obvious that the dimensional difference between the CD-SEM image and the CAD data is small in a central portion of the CD-SEM image while being large at an edge portion of the image. This trend is especially prominent in evaluating a dimensional difference by decreasing the magnification, for example, in evaluating differences between the dimensions of multiple patterns on a single screen. In the second embodiment, matching is performed for each CAD data 101 corresponding to a single memory cell and a corresponding portion of the image data. Accordingly, an error attributable to magnification differences in the memory cell image can be eliminated, and dimensions of each memory cell and corresponding CAD data can be compared.

It is also possible to perform matching in two levels as described in the first embodiment. First, as shown in FIG. 8, matching targeting the entire image is performed, and then matching targeting each CAD data corresponding to a single memory cell is performed again. As a result, not only can an error in association with the position in the memory cell image be eliminated, but also a magnification error can be evaluated more accurately through a comparison with a result of matching targeting the entire image.

Figure 11:
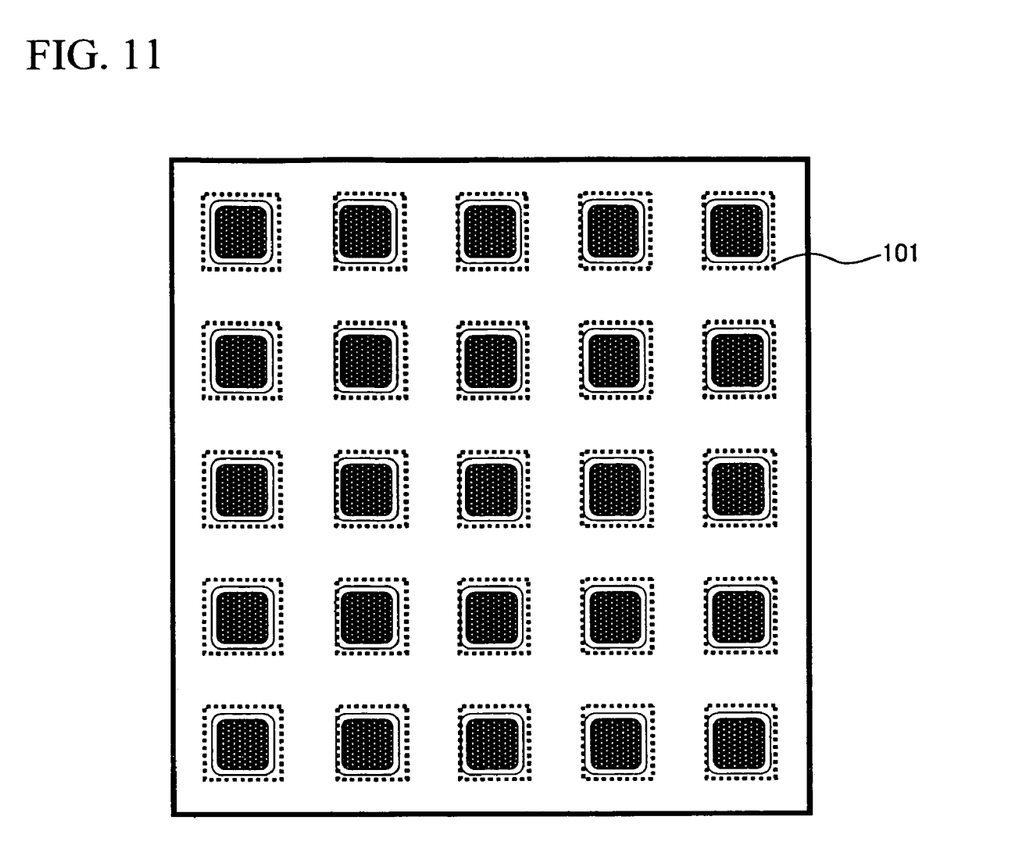
FIG. 11 is a view showing an example of matching performed for each pattern of the CAD data.

FIG. 11 shows a result of matching targeting each hole. Each of the 25 holes and corresponding design data has a uniform positional relationship. Accordingly, dimensional errors can be evaluated in a comparison with CAD data without taking into account a magnification error.

Figure 12:
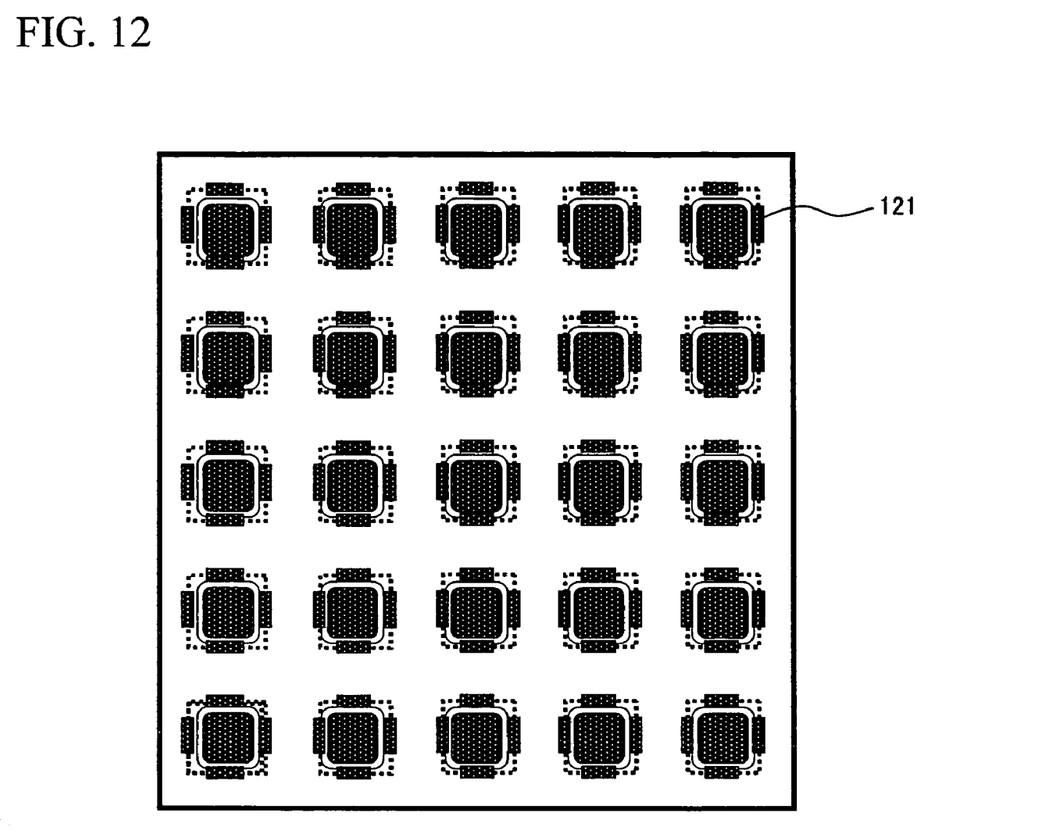
FIG. 12 is a view showing an example of matching selectively using straight line portions of hole patterns.

FIG. 12 shows the same evaluation as that in FIG. 11 except that matching is performed on the holes excluding their corner portions. Here, straight line portions 121 of the holes shown in FIG. 12 are targets of the matching. The CAD data corresponding to the straight line portions 121 are indicated by thick lines. Corner portions of a hole pattern are rounded due to process characteristics, and hence have ununiform shapes. By performing matching targeting part of each pattern, such as the portions 121 indicated by thick lines in FIG. 12, more accurate alignment with the CAD data can be performed.

What is claimed is:

1. A pattern matching method comprising:
a step of performing pattern matching on an image produced by a charged particle beam apparatus and a pre-registered template, wherein:
first pattern matching is performed by using a first template including a sub resolution assist feature (SRAF) pattern and a main pattern assisted by the SRAF pattern, or an optical proximity correction (OPC) pattern and a main pattern corrected by the OPC pattern, and,
after a specific region is specified by the first pattern matching, second pattern matching is performed in the specific region by using a second template which does not include the SRAF pattern or the OPC pattern, and which selectively includes the main pattern.

2. Pattern matching equipment comprising:
a controller for performing pattern matching on an image produced by a charged particle beam apparatus and a pre-registered template, wherein
the controller performs first pattern matching by using a first template including a sub resolution assist feature (SRAF) pattern and a main pattern assisted by the SRAF pattern, or an optical proximity correction (OPC) pattern and a main pattern corrected by the OPC pattern, and,
after a specific region is specified by the first pattern matching, the controller performs second pattern matching in the specific region by using a second template which does not include the SRAF pattern or the OPC pattern, and which selectively includes the main pattern.

* * * * *